US011295389B2

(12) United States Patent
Ketzef

(10) Patent No.: US 11,295,389 B2
(45) Date of Patent: Apr. 5, 2022

(54) AUTOMATED INSURER INSURED INTERACTIONS

(71) Applicant: DAVIDSHIELD L.I.A. (2000) LTD., Netanya (IL)

(72) Inventor: Alon Ketzef, Bnei Dror (IL)

(73) Assignee: DAVIDSHIELD L.I.A (2000) LTD., Netanya (IL)

( * ) Notice: Subject to any disclaimer, the term of this patent is extended or adjusted under 35 U.S.C. 154(b) by 188 days.

(21) Appl. No.: 16/051,536

(22) Filed: Aug. 1, 2018

(65) Prior Publication Data

US 2019/0035029 A1 Jan. 31, 2019

Related U.S. Application Data

(63) Continuation of application No. 12/949,367, filed on Nov. 18, 2010, now abandoned.

(51) Int. Cl.
*G06Q 40/08* (2012.01)
(52) U.S. Cl.
CPC .................................. *G06Q 40/08* (2013.01)
(58) Field of Classification Search
CPC ...................................................... G06Q 40/08
See application file for complete search history.

(56) References Cited

U.S. PATENT DOCUMENTS

| 7,346,523 | B1 * | 3/2008 | Provost | ................. | G06F 19/328 |
| | | | | | 705/2 |
| 7,860,793 | B2 * | 12/2010 | Karkanias | ............ | G06Q 20/105 |
| | | | | | 705/41 |
| 2002/0152179 | A1 * | 10/2002 | Racov | ................ | G06Q 20/3223 |
| | | | | | 705/67 |

(Continued)

OTHER PUBLICATIONS

Jim Talley, B. W. (May 23, 1994). Medical Management Firm Into Foreign Service Company Lines up Medical Services for Foreign Insurance Companies That Specialize in International Travelers and Foreign Nationals Seeking Health Care in the U.S . . . : [All edition]. Sun Sentinel Retrieved from https://dialog.proquest.com/professional/docview/388696780?accountid=131444 on Nov. 16, 2021 (Year: 1994).*

*Primary Examiner* — Kito R Robinson
(74) *Attorney, Agent, or Firm* — Vladimir Sherman; Professional Patent Solutions Ltd

(57) ABSTRACT

A computerized immediate settlement insurance claim payment system comprising insurance policy issuing functionality for issuing an insurance policy to an insured, and associating the policy with an insurance card to be presented by the insured in association with a card reader to cover the cost of an insurance event, the policy including a chargeback provision allowing the insurer to charge back payments made to the insured via an identified credit card of the insured; automatic insurance claim verification functionality operative to verify the right of the insured to receive payment from the insurer by verifying at least one of the value of the payment, the type and location of the recipient; insurance claim documentation requesting functionality operative to request from the insured documentation of the insured event; and chargeback functionality operative to charge back, in the absence of documentation, at least part of the payment via the identified credit card.

10 Claims, 15 Drawing Sheets

(56) References Cited

U.S. PATENT DOCUMENTS

2011/0161118 A1* 6/2011 Borden .................. G06Q 50/22
                                                        705/4
2012/0046976 A1* 2/2012 Rourk .................. G06Q 20/227
                                                        705/4

* cited by examiner

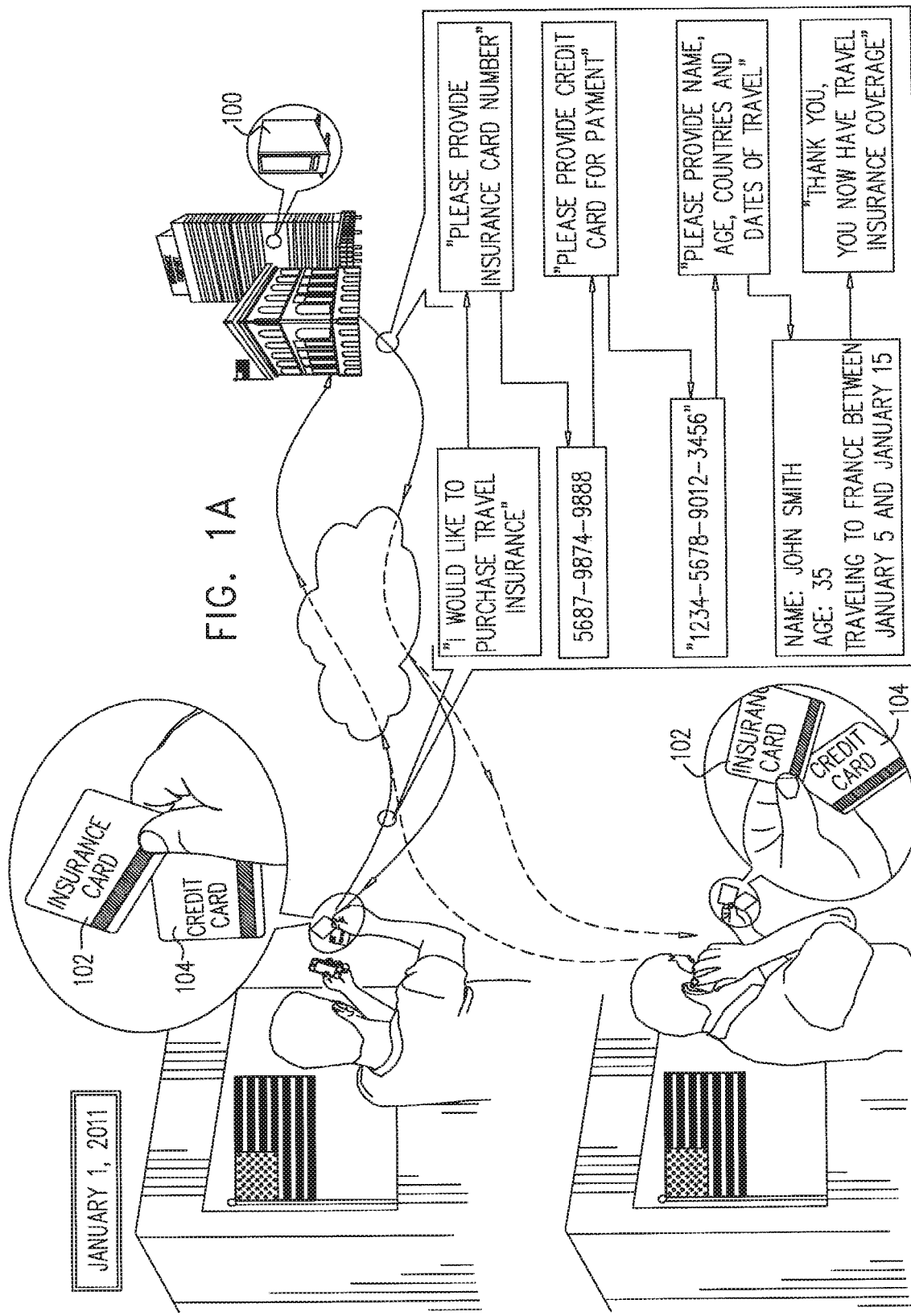

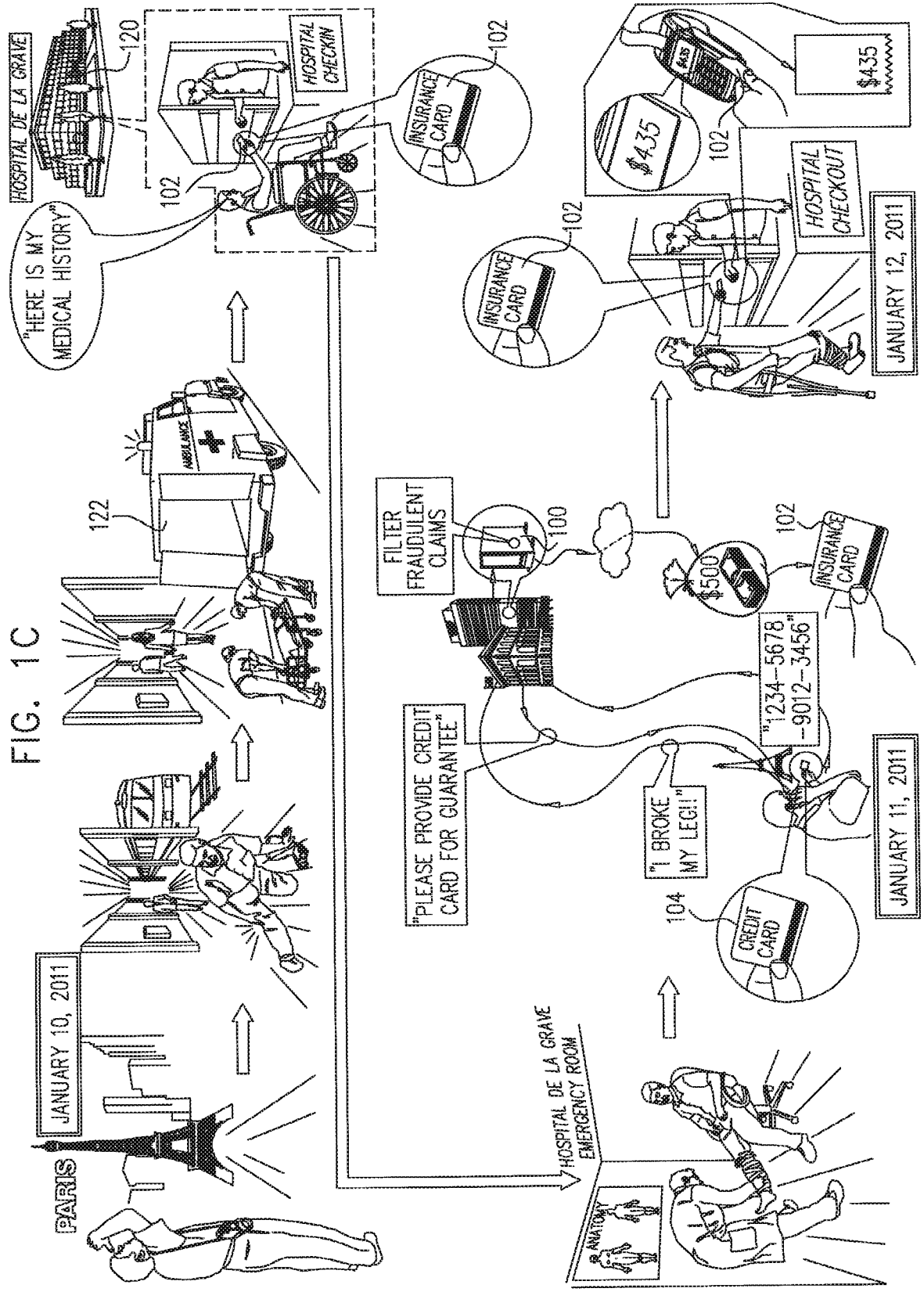

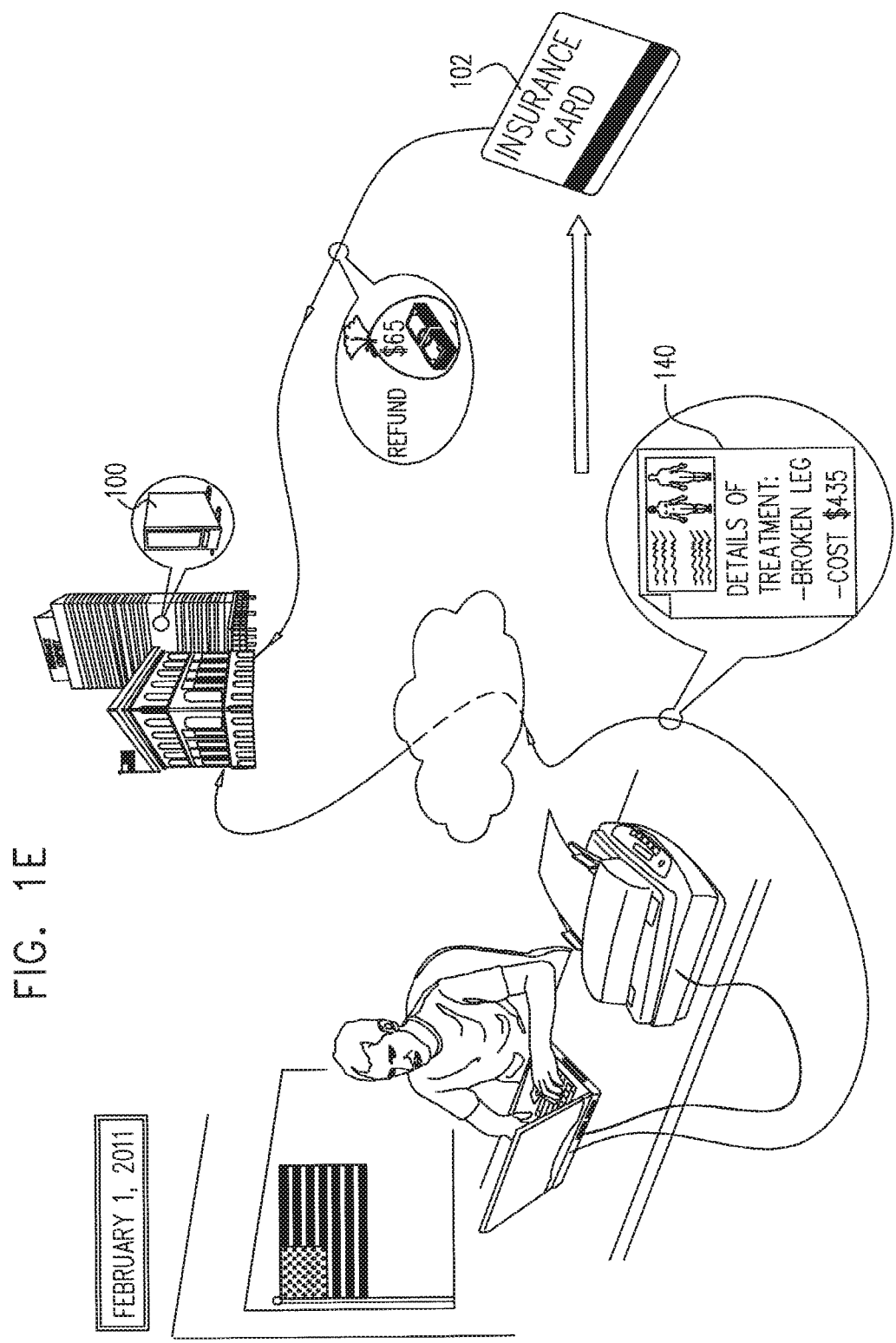

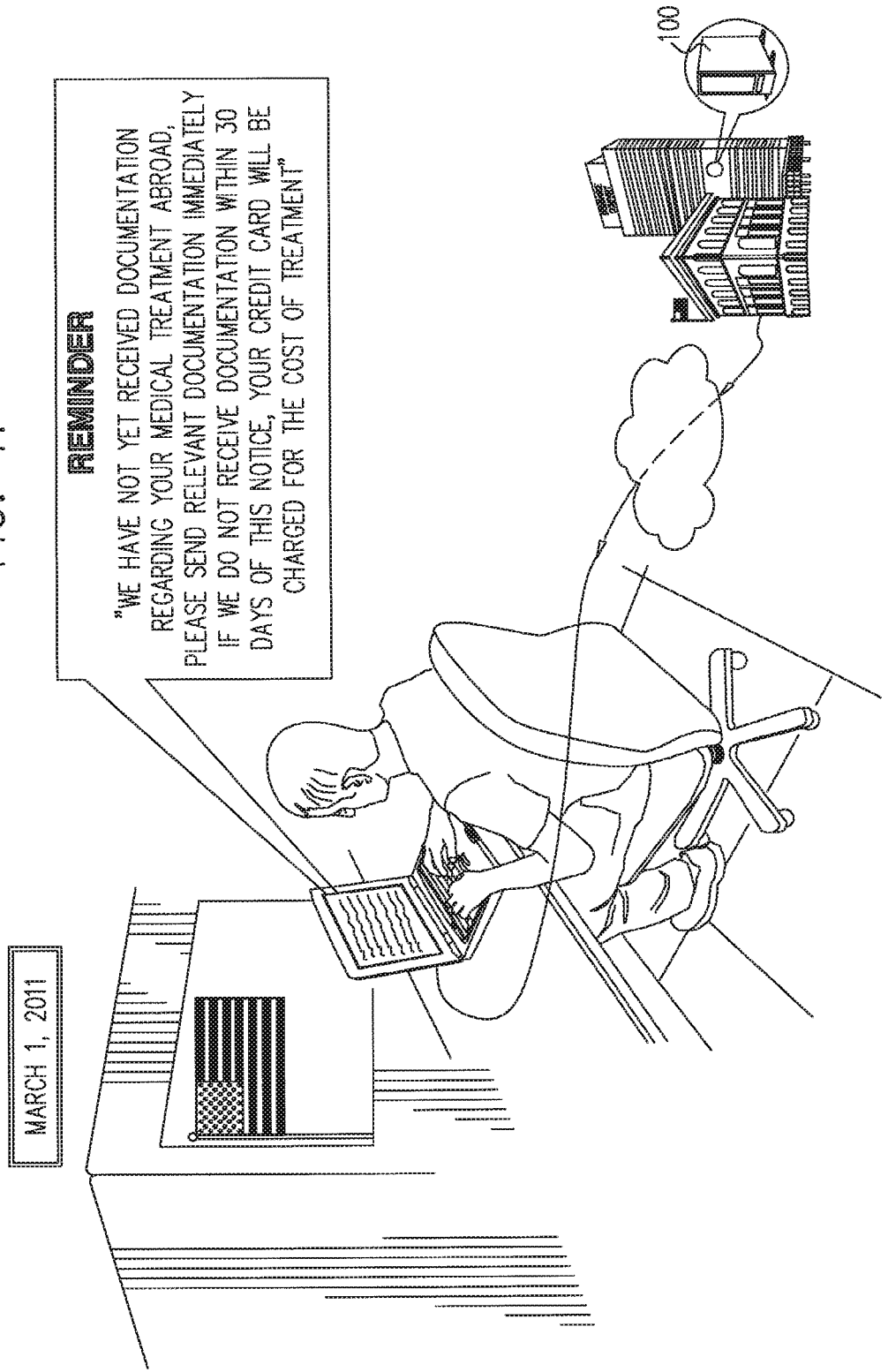

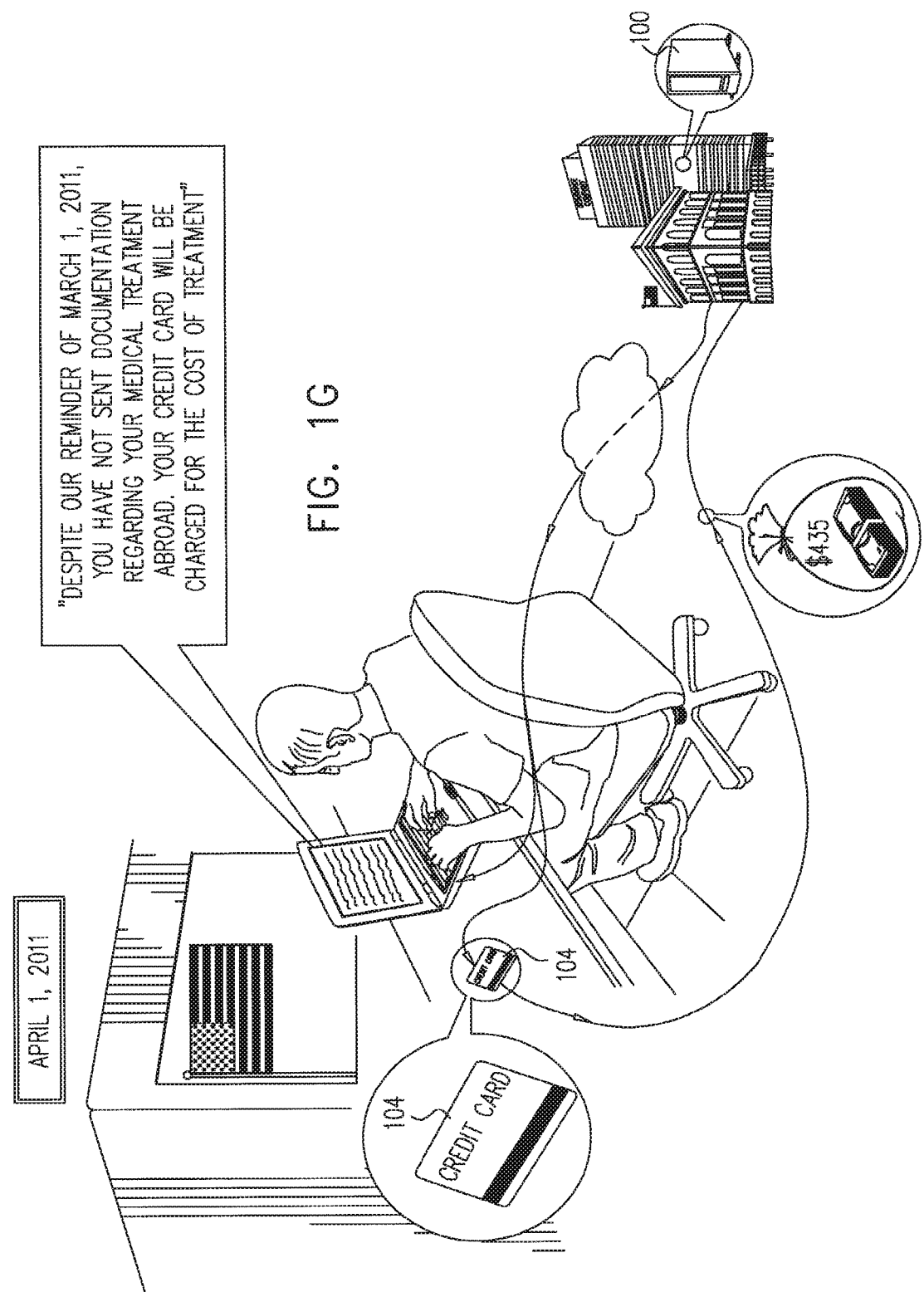

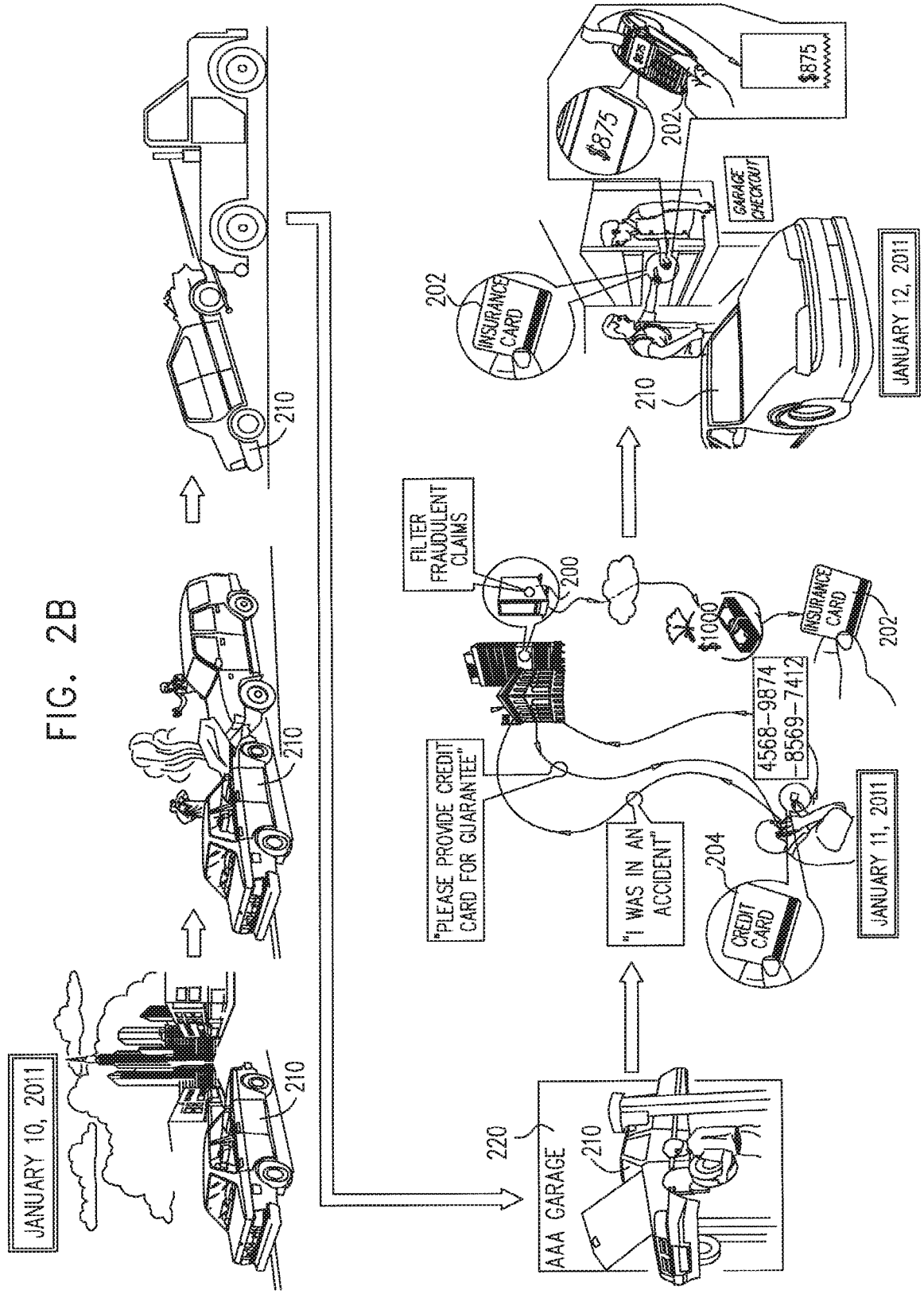

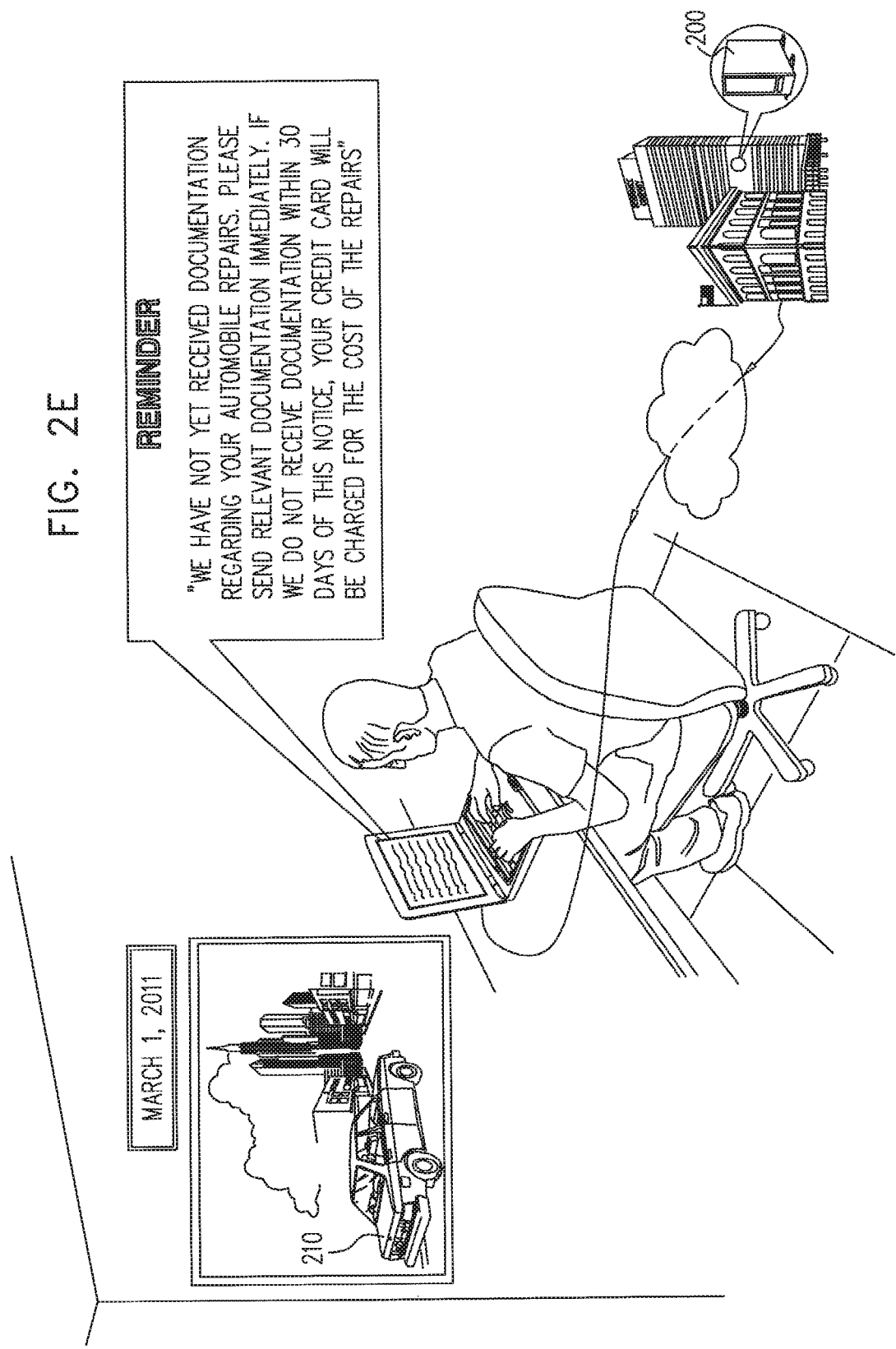

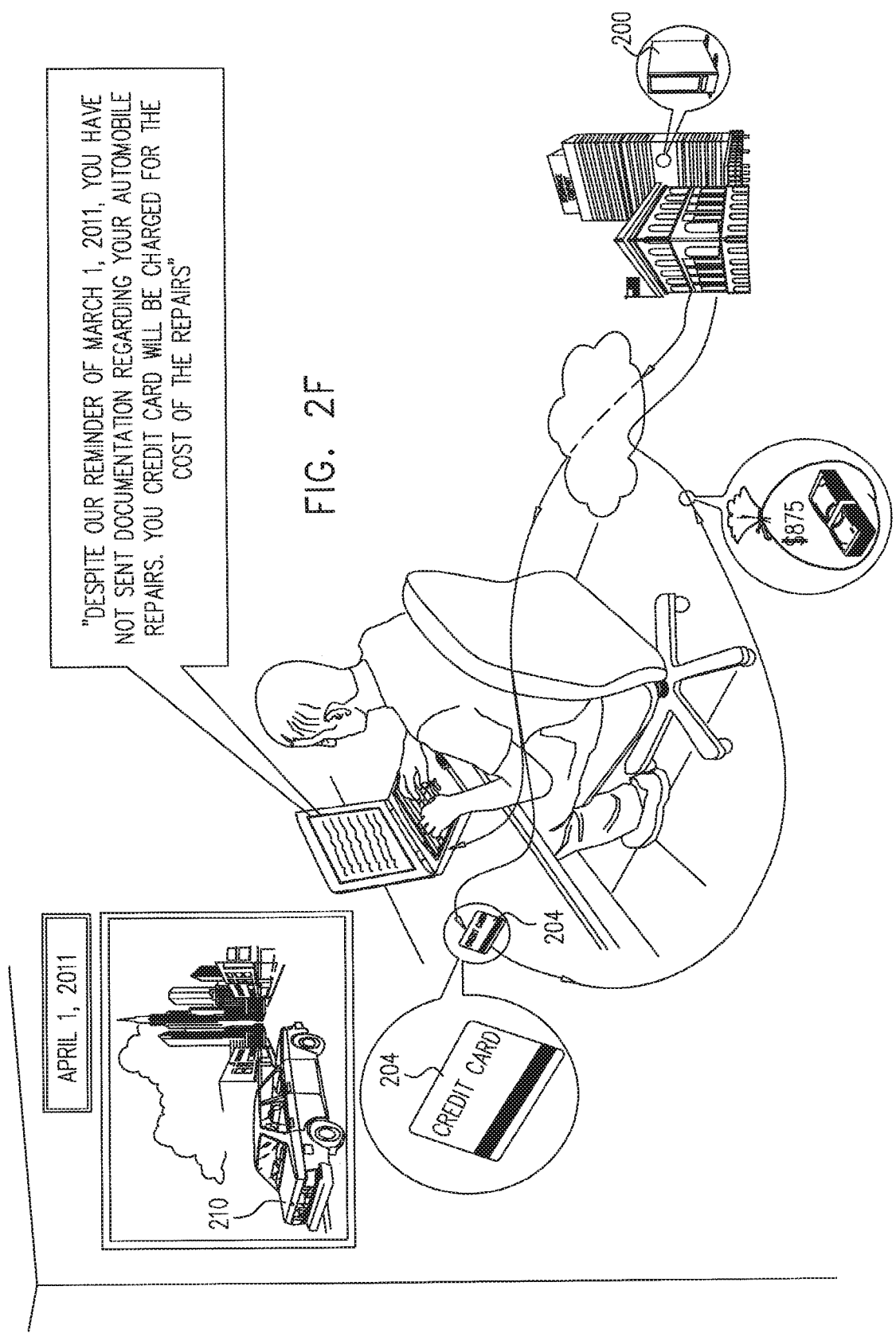

AUTOMATED INSURER INSURED INTERACTIONS

FIELD OF THE INVENTION

The present invention relates to systems and methodologies for automated insurer-insured interactions.

BACKGROUND OF THE INVENTION

The following publications are believed to represent the current state of the art:

U.S. Pat. Nos. 4,491,725; 4,858,121; 5,235,507; 5,359,509; 6,343,310; 6,609,200; 6,823,075; 6,941,363; 7,028,012; 7,039,603; 7,236,950; 7,287,071; 7,380,707; 7,434,729; 7,584,125; 7,590,557; 7,698,182 and 7,792,686;

U.S. Published Patent Application Nos.: 2005/0086075 and 2005/0122953; and all references cited therein.

SUMMARY OF THE INVENTION

The present invention seeks to provide improved systems and methodologies for automated insurer-insured interactions.

There is thus provided in accordance with a preferred embodiment of the present invention a computerized immediate settlement insurance claim payment system comprising insurance policy issuing functionality for issuing, by an insurer, an insurance policy to an insured, and associating the policy with an insurance card to be carried by the insured and, upon the occurrence of an insured event, to be presented by the insured in association with a card reader to cover at least part of the cost of the insurance event, the insurance policy including a charge back provision allowing the insurer to charge back payments made to the insured via an identified credit card of the insured; automatic insurance claim verification functionality which, responsive to presentation of the insurance card, is operative to automatically verify the right of the insured to receive payment from the insurer by automatically verifying at least one of the value of the payment, the type of recipient entitled to receive such payment as identified by the card reader and the location of the recipient as identified by the card reader; insurance claim documentation requesting functionality operative to request from the insured, at the initiative of the insurer, following paying of the payment, documentation relating to the insured event; and chargeback functionality operative to charge back, at the initiative of the insurer, in the absence of receipt of the documentation, at least part of the payment via the identified credit card of the insured.

Preferably, the insurance card is a debit card. Alternatively, the insurance card is a credit card.

In accordance with a preferred embodiment of the present invention, the insurance policy issuing functionality includes automatic activation functionality operative to automatically activate the insurance policy based on the existence of at least one of a multiplicity of predetermined conditions. Preferably, the multiplicity of predetermined conditions includes time-based conditions and location-based conditions. Preferably, existence of the location-based conditions is ascertained by an RFID detector in association with an RFID chip. Preferably, the RFID chip is embedded in the insurance card. Alternatively, existence of the location-based conditions is ascertained by cell phone locating techniques in association with a cell phone carried by the insured. Preferably, the insurance card includes a record of the insured's medical history.

In accordance with a preferred embodiment of the present invention, the automatic insurance claim verification functionality also includes automatic fraud detection functionality which includes automatic voice analysis functionality operative to automatically analyze the voice of the insured.

There is also provided in accordance with another preferred embodiment of the present invention a computerized immediate settlement insurance claim payment system comprising insurance policy issuing functionality for issuing, by an insurer, an insurance policy to an insured, the insurance policy including a charge back provision allowing the insurer to charge back payments made to the insured, via an identified credit card of the insured; insurance event reporting functionality for receiving, upon occurrence of an insured event, communication of the event to the insurer by the insured; automatic insurance claim verification functionality communicating with the insurance event reporting functionality which, responsive to the communication, is operative to automatically verify the right of the insured to receive payment from the insurer by automatically verifying at least one of the value of the payment, the type of recipient entitled to receive such payment and the location of the recipient; advance funding functionality operative to transfer estimated value of the payment to the insured by the insurer; insurance claim documentation requesting functionality operative to request from the insured, at the initiative of the insurer and after paying of the payment by the insured, documentation relating to the insured event; and balance collection functionality operative to collect from the insured, at the initiative of the insurer, the difference between transferred estimated value of the payment and the payment.

In accordance with a preferred embodiment of the present invention, the system also includes chargeback functionality operative to charge back, at the initiative of the insurer, in the absence of receipt of the documentation, at least part of the payment via the identified credit card of the insured. Preferably, at least one of the transferring, paying and collecting is achieved via an insurance card associated with the policy and carried by the insured. Additionally or alternatively, at least one of the transferring, paying and collecting is achieved via at least one of the insured's credit card, debit card, cell phone account and personal bank account.

Preferably, the insurance card is a debit card. Alternatively, the insurance card is a credit card.

In accordance with a preferred embodiment of the present invention, the insurance policy issuing functionality includes automatic activation functionality operative to automatically activate the insurance policy based on the existence of at least one of a multiplicity of predetermined conditions. Preferably, the multiplicity of predetermined conditions includes time-based conditions and location-based conditions. Preferably, existence of the location-based conditions is ascertained by an RFID detector in association with an RFID chip. Preferably, the RFID chip is embedded in the insurance card. Alternatively, existence of the location-based conditions is ascertained by cell phone locating techniques in association with a cell phone carried by the insured. Preferably, the insurance card includes a record of the insured's medical history.

In accordance with a preferred embodiment of the present invention, the automatic insurance claim verification functionality also includes automatic fraud detection functionality which includes automatic voice analysis functionality operative to automatically analyze the voice of the insured.

There is further provided in accordance with yet another preferred embodiment of the present invention a computerized immediate settlement insurance claim payment system comprising insurance policy issuing functionality for issuing, by an insurer, an insurance policy to an insured, the insurance policy including a charge back provision allowing the insurer to charge back payments made to the insured, via an identified credit card of the insured; insurance event reporting functionality for receiving, at the initiative of the insured and after payment by the insured of the cost of an insured event, communication of the event to the insurer by the insured; automatic insurance claim verification functionality communicating with the insurance event reporting functionality which, responsive to the communication, is operative to automatically verify the right of the insured to receive reimbursement from the insurer by automatically verifying at least one of the value of the payment, the type of recipient entitled to receive such payment and the location of the recipient; reimbursement functionality operative to reimburse the value of the payment to the insured by the insurer; insurance claim documentation requesting functionality operative to request from the insured, at the initiative of the insurer, documentation relating to the insured event; and chargeback functionality operative to charge back, at the initiative of the insurer, in the absence of receipt of the documentation, at least part of value of the payment via the identified credit card of the insured.

In accordance with a preferred embodiment of the present invention, the reimbursing is achieved via an insurance card associated with the policy and carried by the insured. Additionally or alternatively, the reimbursing is achieved via at least one of the insured's credit card, debit card, cell phone account and personal bank account. Preferably, the insurance card is a debit card. Alternatively, the insurance card is a credit card.

Preferably, the insurance policy issuing functionality includes automatic activation functionality operative to automatically activate the insurance policy based on the existence of at least one of a multiplicity of predetermined conditions. Preferably, the multiplicity of predetermined conditions includes time-based conditions and location-based conditions. Preferably, existence of the location-based conditions is ascertained by an RFID detector in association with an RFID chip. Preferably, the RFID chip is embedded in the insurance card. Alternatively, existence of the location-based conditions is ascertained by cell phone locating techniques in association with a cell phone carried by the insured.

Preferably, the insurance card includes a record of the insured's medical history.

In accordance with a preferred embodiment of the present invention, the automatic insurance claim verification functionality also includes automatic fraud detection functionality which includes automatic voice analysis functionality operative to automatically analyze the voice of the insured.

There is yet further provided in accordance with still another preferred embodiment of the present invention a computerized immediate settlement insurance claim payment method comprising issuing, by an insurer, an insurance policy to an insured and associating the policy with an insurance card to be carried by the insured, the insurance policy including a charge back provision allowing the insurer to charge back payments made to the insured via an identified credit card of the insured; upon occurrence of an insured event, presentation of the insurance card by the insured in association with a card reader to cover at least part of the cost of the insured event; responsive to presentation of the insurance card, automatic verification of the right of the insured to receive payment from the insurer including at least one of automatic verification of the value of the payment, the type of recipient entitled to receive such payment as identified by the card reader and the location of the recipient as identified by the card reader; at the initiative of the insurer, following the payment, requesting documentation relating to the insured event; and at the initiative of the insurer, in the absence of receipt of the requested documentation, charging back at least part of the payment via the identified credit card of the insured.

There is also provided in accordance with another preferred embodiment of the present invention a computerized immediate settlement insurance claim payment method comprising issuing, by an insurer, an insurance policy to an insured, the insurance policy including a charge back provision allowing the insurer to charge back payments made to the insured, via an identified credit card of the insured; upon occurrence of an insured event, communication of the event to the insurer by the insured; responsive to the communication, automatic verification of the right of the insured to receive payment from the insurer including at least one of automatic verification of the value of the payment, the type of recipient entitled to receive such payment and the location of the recipient; transferring of estimated value of the payment to the insured by the insurer; paying, by the insured, of the payment; at the initiative of the insurer, following the paying, requesting documentation relating to the insured event; and at the initiative of the insurer, collecting, from the insured, the difference between the transferred estimated value of the payment and the payment.

There is further provided in accordance with yet another preferred embodiment of the present invention a computerized immediate settlement insurance claim payment method comprising issuing, by an insurer, an insurance policy to an insured, the insurance policy including a charge back provision allowing the insurer to charge back payments made to the insured, via an identified credit card of the insured; at the initiative of the insured, after payment by the insured of the cost of an insured event, communication of the event to the insurer by the insured; responsive to the communication, automatic verification of the right of the insured to receive reimbursement from the insurer including at least one of automatic verification of the value of the payment, the type of recipient entitled to receive such payment and the location of the recipient; reimbursing of value of the payment to the insured by the insurer; at the initiative of the insurer, following the reimbursing, requesting documentation relating to the insured event; and at the initiative of the insurer, in the absence of receipt of the requested documentation, charging back at least part of value of the payment via the identified credit card of the insured.

BRIEF DESCRIPTION OF THE DRAWINGS

The present invention will be understood and appreciated more fully from the following detailed description, taken in conjunction with the drawings in which:

FIGS. 1A, 1B, 1C, 1D, 1E, 1F and 1G are simplified pictorial illustrations of steps in an insurer-insured interaction employing the system and methodology of a preferred embodiment of the present invention;

FIGS. 2A, 2B, 2C, 2D, 2E and 2F are simplified pictorial illustrations of steps in an insurer-insured interaction employing the system and methodology of another preferred embodiment of the present invention;

DETAILED DESCRIPTION OF PREFERRED EMBODIMENTS

Figure 1B:
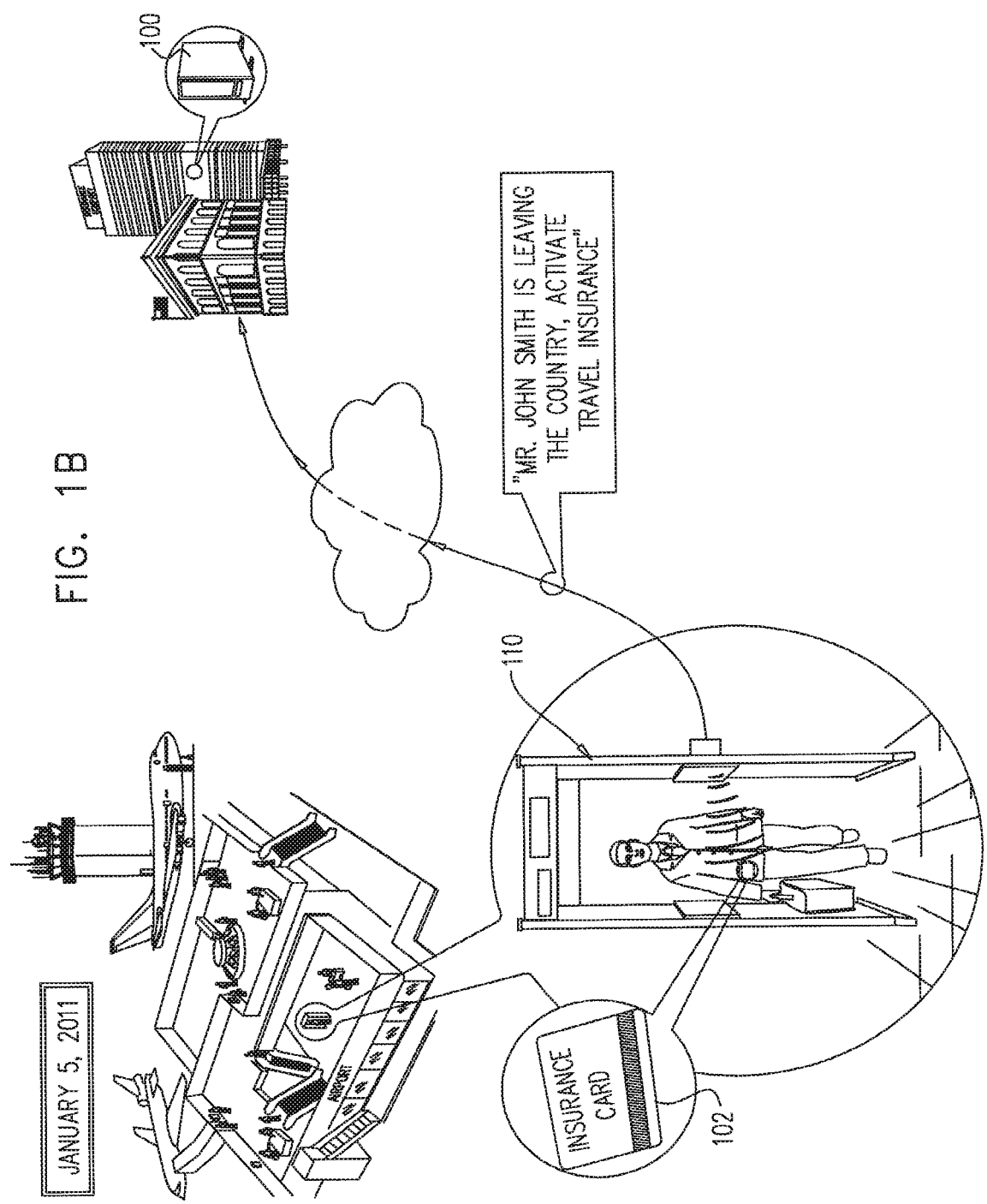

Reference is now made to FIGS. 1A, 1B, 1C, 1D, 1E, 1F and 1G, which are simplified pictorial illustrations of steps in an insurer-insured interaction employing the system and methodology of a preferred embodiment of the present invention. The system of FIG. 1 is a computerized immediate settlement insurance claim payment system comprising insurance policy issuing functionality for issuing, by an insurer, an insurance policy to an insured, and associating the policy with an insurance card to be carried by the insured. Upon the occurrence of an insured event, the insurance card is to be presented by the insured in association with a card reader to cover at least part of the cost of the insurance event. The insurance policy includes a charge back provision allowing the insurer to charge back payments made to the insured via an identified credit card of the insured.

The immediate settlement insurance claim payment system also comprises automatic insurance claim verification functionality which, responsive to presentation of the insurance card, is operative to automatically verify the right of the insured to receive payment from the insurer by automatically verifying at least one of the value of the payment, the type of recipient entitled to receive such payment as identified by the card reader and the location of the recipient as identified by the card reader.

The immediate settlement insurance claim payment system also comprises insurance claim documentation requesting functionality operative to request from the insured, at the initiative of the insurer, following paying of the payment, documentation relating to the insured event, and chargeback functionality operative to charge back, at the initiative of the insurer, in the absence of receipt of the documentation, at least part of the payment via the identified credit card of the insured.

As shown in FIG. 1A, prior to traveling, such as on Jan. 1, 2011, a potential purchaser of travel insurance contacts an insurer which utilizes a self-executing insurance claim payment system 100, to purchase travel insurance to be associated with an insurance card 102 using a credit card 104. It is appreciated that insurance card 102 may be distributed free of charge by travel agencies, publishers of travel information, or by any other entity. As seen in FIG. 1A, contact with the insurer may be via telephone or via an automated telephone-operated system.

Upon establishing contact with the insurer, the potential purchaser of travel insurance is prompted for an insurance card identification number and for personal credit card information to pay for the travel insurance. It is appreciated that a potential purchaser of travel insurance may not be in possession of an insurance card when contacting the insurer, and may be provided with an insurance card after purchasing the travel insurance.

Additionally, the potential purchaser of travel insurance is prompted for information pertaining to his future travels, such as dates of travel and destination. Upon providing the requested information, the information is stored in system 100 which provides confirmation of purchase of travel insurance to the purchaser.

It is a particular feature of the present invention that an insurance card 102, once associated with an insurance contract, preferably serves as a debit card to which reimbursements of expenses incurred by the insured under the coverage provided by the insurance contract are transferred, under the terms of the insurance contract.

Turning now to FIG. 1B, it is shown that on the planned date of departure of January 5, the insured arrives at a port of departure such as an airport. Once inside the port of departure, the insured preferably passes through a portal 110 which automatically detects the insured's insurance card 102, such as by an RFID mechanism which is part of portal 110, which mechanism detects an RFID chip embedded in insurance card 102, and thereby ascertains the insured's presence at the port of departure. Alternatively, the insured's presence at the port of departure may be ascertained by determining the location of the insured's cell phone using standard cell phone locating techniques.

Upon ascertaining the insured's presence at the port of departure, a communication system (not shown) which is part of portal 110 notifies self-executing insurance claim payment system 100 of the insured's imminent departure, which causes system 100 to automatically activate the insured's travel insurance. Alternatively, upon ascertaining the insured's presence at the port of departure, the insurer may contact the insured before activating the insured's travel insurance to verify the insured's present medical condition or travel plans. In the absence of mechanisms operative to automatically ascertain the insured's presence at the port of departure, the insured may contact the insurer to report his imminent departure, and to request activation of the insurance.

Turning now to FIG. 1C, it is shown that while abroad, on a later date such as on January 10, the insured injures his leg. The insured is taken to a hospital 120 by an ambulance 122 and provides access to his medical history to the hospital staff. Preferably, the insured's medical history is encoded on insurance card 102 at the time of purchase of the travel insurance.

As shown in FIG. 1C, the insured receives appropriate medical treatment, and contacts the insurer to report details of the injury and of the medical facility where treatment is being received, and to request advance funding of the estimated cost of the treatment. In response, the insured is prompted to provide personal credit card details for guarantee.

It is a particular feature of the present invention that self-executing insurance claim payment system 100 includes fraud detection functionality which is automatically operative to detect, with a high degree of certainty, fraudulent claims reported to the insurer. This detection may be achieved, for example, by voice analysis techniques or by statistical analysis.

It is another particular feature of the present invention that for claims which system 100 determines, with a high degree of certainty, to be legitimate, system 100 is operative to automatically provide advance funding of expected medical expenses incurred by the insured under the coverage provided by the insurance, based on the reporting by the insured of the medical expense incurred. Preferably, advance funding is automatically transferred by system 100 to the insured's insurance card 102. Alternatively, the advance funding may be provided to the insured, for example, by crediting the insured's credit\debit card, bank account, or any other personal banking or crediting system.

It is yet another particular feature of the present invention that the system 100 requires that credit card details of the insured be provided to serve as a guarantee to be invoked by the system 100 to reimburse the insurer in a case where the insured has received from the insurer compensation for fraudulent or unjustified insurance claims, despite activation of the fraud detection functionality.

It is appreciated that system 100 comprises a knowledge base which facilitates calculation of expected medical expenses, which knowledge base includes accumulated statistics of cost of treatment of a wide range of medical treatments provided in any of a wide range of locales and medical institutions around the world.

Returning now to FIG. 1C, upon determining with a high degree of certainty that the insured's claim is legitimate, and upon obtaining a guarantee in the form of the insured's personal credit card details, advance funding is preferably provided to the insured via the insured's insurance card 102. As seen in FIG. 1C, the insured's insurance card 102 is credited with $500, which is the expected cost of the insured's medical expense as estimated by system 100.

Upon checking out of the hospital 120, the insured is charged $435 for the medical treatment he received at the hospital 120, which the insured pays using insurance card 102. It is appreciated that the actual charge of $435 is less than the $500 credited to insurance card 102.

Figure 1D:
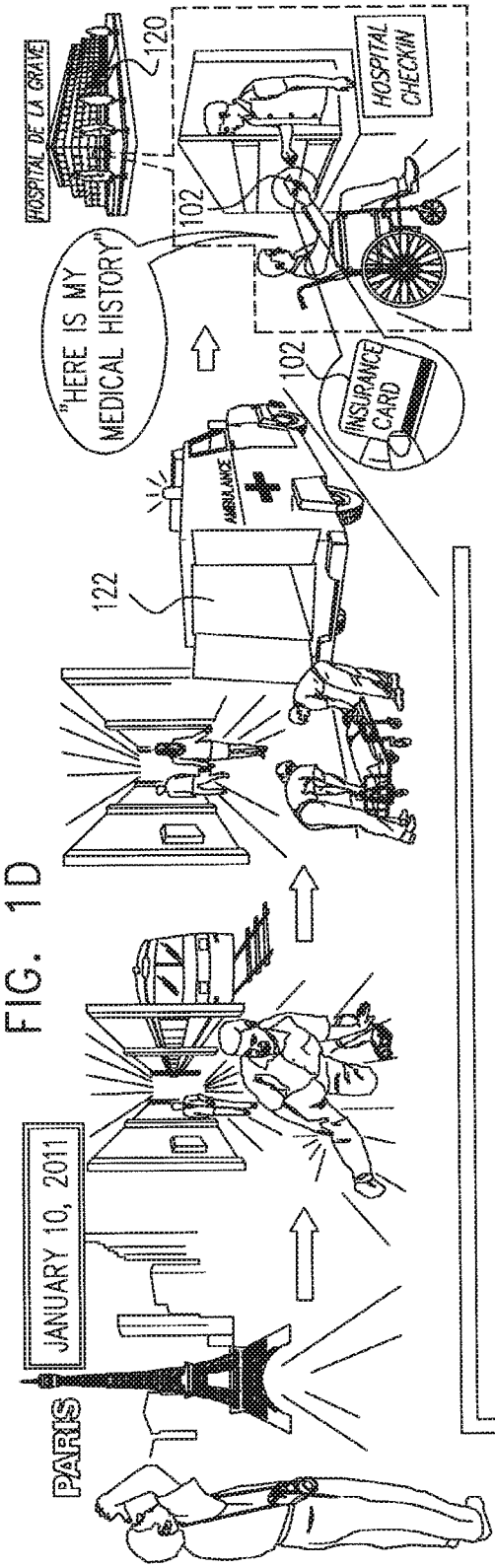
Figure 1D:
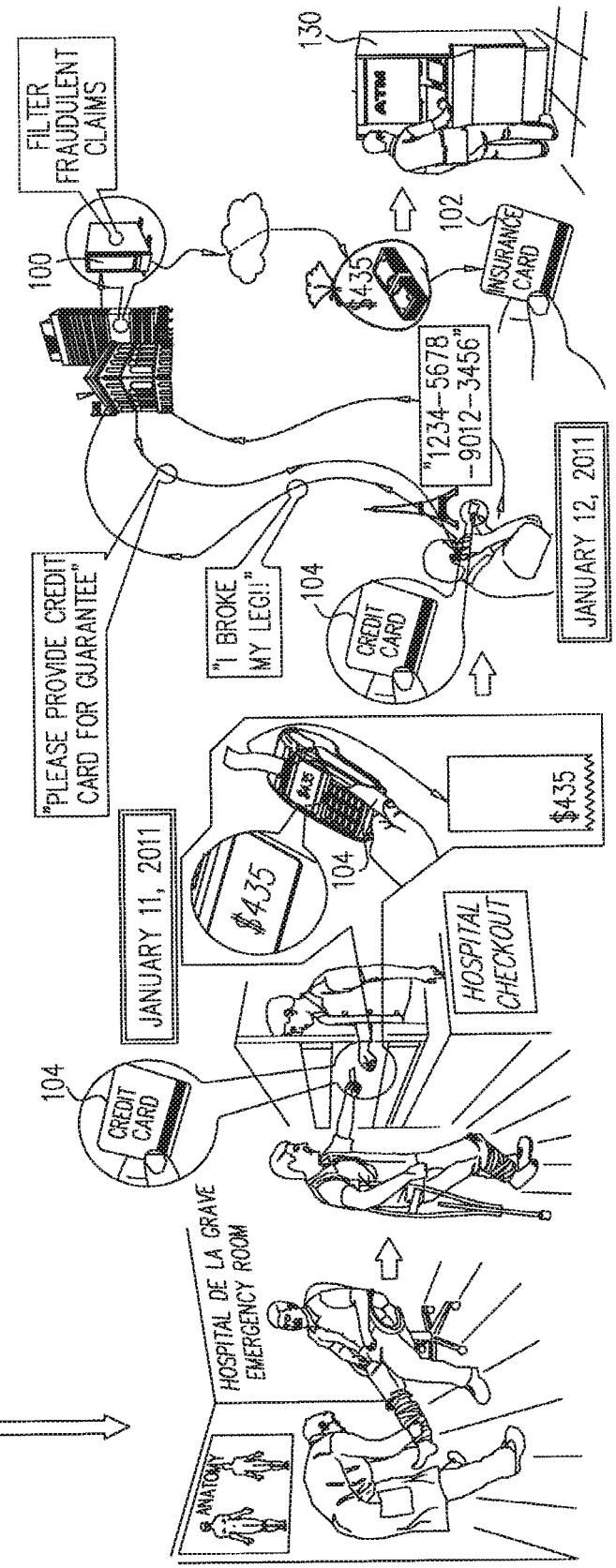

Alternatively, as shown in FIG. 1D, the insured defers contacting the insurer until after completing the medical treatment and after paying $435 to the hospital 120. Payment may be achieved, for example, by charging the insured's credit card 104. After checking out of the hospital 120, the insured contacts the insurer to report the injury and to request reimbursement for the cost of the treatment. In response, the insured is prompted to provide personal credit card details for guarantee. Upon determining with a high degree of certainty that the insured's claim is not fraudulent or unjustified, and upon obtaining a guarantee in the form of the insured's personal credit card 104 details, reimbursement is preferably provided to the insured via the insured's insurance card 102, personal credit card 104, personal debit card, or to the insured's bank account. As seen in FIG. 1D, subsequent to the reimbursement, the insured withdraws the reimbursed sum of $435 via an ATM machine 130.

Turning now to FIG. 1E, it is shown that upon returning from abroad, such as on February 1, the insured provides documentation 140 to the insurer regarding medical treatment provided and any related costs incurred during the insured's trip abroad. Upon receiving documentation 140 of the treatment and its cost of $435 from the insured, self-executing insurance claim payment system 100 collects any difference between sums previously forwarded to the insured and the actual justified cost of the treatment as determined by the insurer, from the insured's insurance card 102. In the scenario of FIG. 1C this difference is $65, which is the difference between the $500 originally forwarded to the insured and the $435 which the insured actually paid for the treatment.

Alternatively, as shown in FIG. 1F, should the insured fail to provide such documentation within a reasonable amount of time, such as by March 1, self-executing insurance claim payment system 100 sends the insured a reminder to provide the documentation, warning him that failure to do so will result in the insurer invoking the guarantee provided in the form of credit card 104, as described hereinabove with regard to FIGS. 1C & 1D.

As shown in FIG. 1G, should the insured fail to provide relevant documentation by April 1, despite the warning sent by the insurer, self-executing insurance claim payment system 100 invokes the guarantee provided in the form of credit card 104, and charges the insured's credit card 104 for the total amount of $435 previously provided to the insured.

Figure 2A:
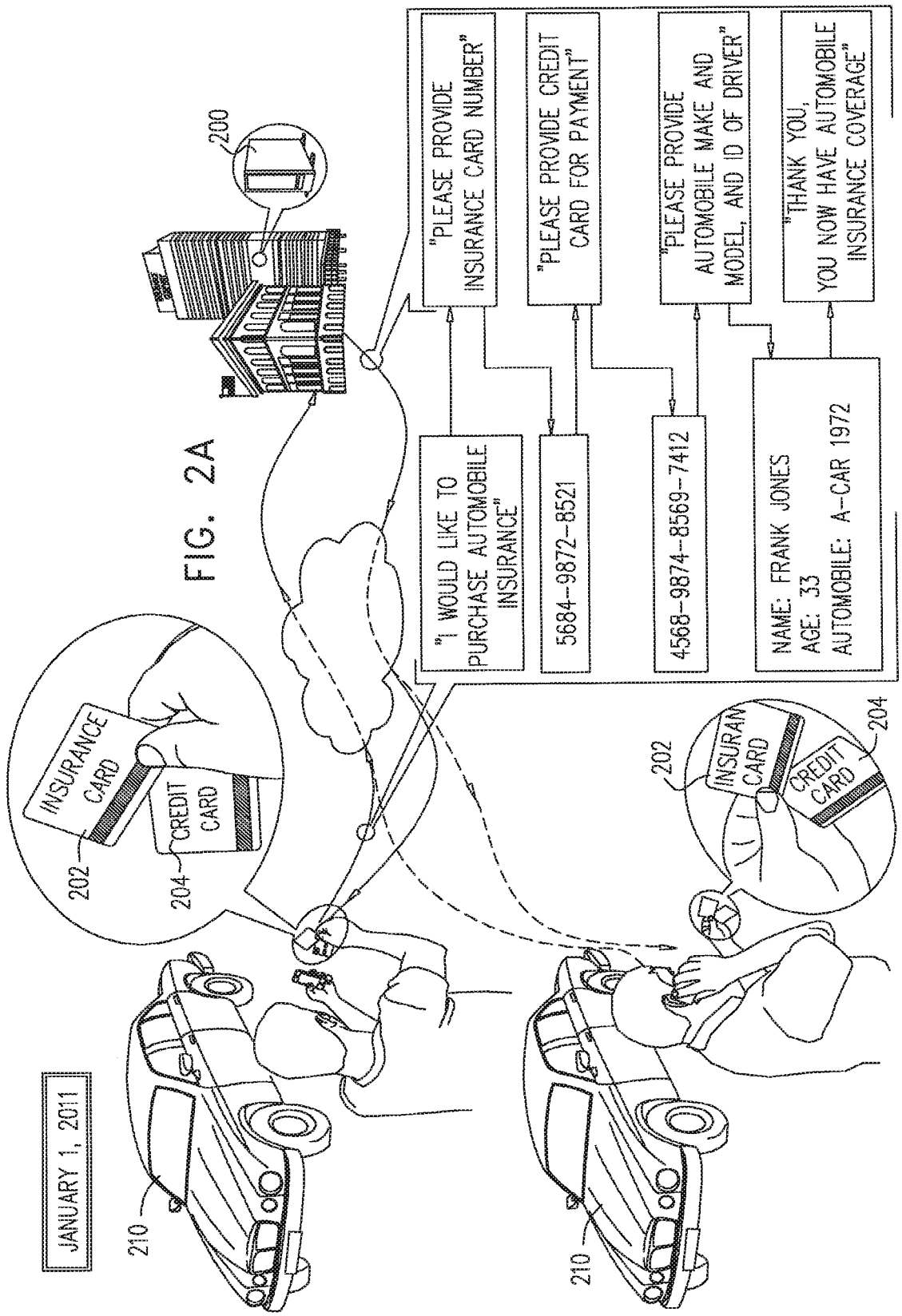

Reference is now made to FIGS. 2A, 2B, 2C, 2D, 2E and 2F, which are simplified pictorial illustrations of steps in an insurer-insured interaction employing the system and methodology of another preferred embodiment of the present invention. As shown in FIG. 2A, on Jan. 1, 2011, a potential purchaser of automobile insurance contacts an insurer which utilizes a self-executing insurance claim payment system 200, to purchase automobile insurance to be associated with an insurance card 202 using a credit card 204. It is appreciated that insurance card 202 may be distributed free of charge by automobile dealers, or by any other entity. As seen in FIG. 2A, contact with the insurer may be via telephone or via an automated telephone-operated system.

Upon establishing contact with the insurer, the potential purchaser of automobile insurance is prompted for an insurance card identification number and for personal credit card information. It is appreciated that a potential purchaser of automobile insurance may not be in possession of an insurance card when contacting the insurer, and may be provided with an insurance card after purchasing the automobile insurance.

Additionally, the potential purchaser of automobile insurance is prompted for information pertaining to the automobile 210 to be insured, such as make and model and identification of designated drivers. Upon providing the requested information, the information is stored in system 200 which provides confirmation of purchase of automobile insurance to the purchaser and activates the automobile insurance.

Turning now to FIG. 2B, it is shown that on a later date such as on January 10, the insured automobile 210 is involved in an automobile accident. The automobile 210 is towed to a garage 220 where it is repaired. As shown in FIG. 2B, the insured contacts the insurer to report details of the accident and of the garage where repairs are being made to the automobile 210, and to request advance funding of the estimated cost of the repairs. In response, the insured is prompted to provide personal credit card details for guarantee.

It is a particular feature of the present invention that self-executing insurance claim payment system 200 includes fraud detection functionality which is automatically operative to detect, with a high degree of certainty, fraudulent claims reported to the insurer. This detection may be achieved, for example by voice analysis techniques or by statistical analysis.

It is another particular feature of the present invention that for claims which system 200 determines, with a high degree of certainty, to be legitimate, system 200 is operative to automatically provide advance funding of expected expenses incurred by the insured under the coverage provided by the insurance, based on the reporting by the insured of the expense incurred. Preferably, advance funding is automatically transferred by system 200 to the insured's insurance card 202. Alternatively, the advance funding may be provided to the insured, for example, by crediting the insured's credit\debit card, bank account, or any other personal banking or crediting system.

It is yet another particular feature of the present invention that the system 200 requires that credit card details of the insured be provided to serve as a guarantee to be invoked by the system 200 to reimburse the insurer in a case where the insured has received from the insurer compensation for fraudulent or unjustified insurance claims, despite activation of the fraud detection functionality.

It is appreciated that system 200 comprises a knowledge base which facilitates calculation of expected automobile repair expenses, which knowledge base includes accumulated statistics of cost of a wide range of automobile repairs provided in any of a wide range of locales.

Returning now to FIG. 2B, upon determining with a high degree of certainty that the insured's claim is legitimate, and upon obtaining a guarantee in the form of the insured's personal credit card details, advance funding is preferably provided to the insured via the insured's insurance card 202. As seen in FIG. 2B, the insured's insurance card 202 is credited with $1000, which is the expected cost of the insured's automobile repairs as estimated by system 200.

Upon checking out of the garage 220, the insured is charged $875 for the repairs done at the garage 220, which the insured pays using insurance card 202. It is appreciated that the actual charge of $875 is less than the $1000 credited to insurance card 202.

Figure 2C:
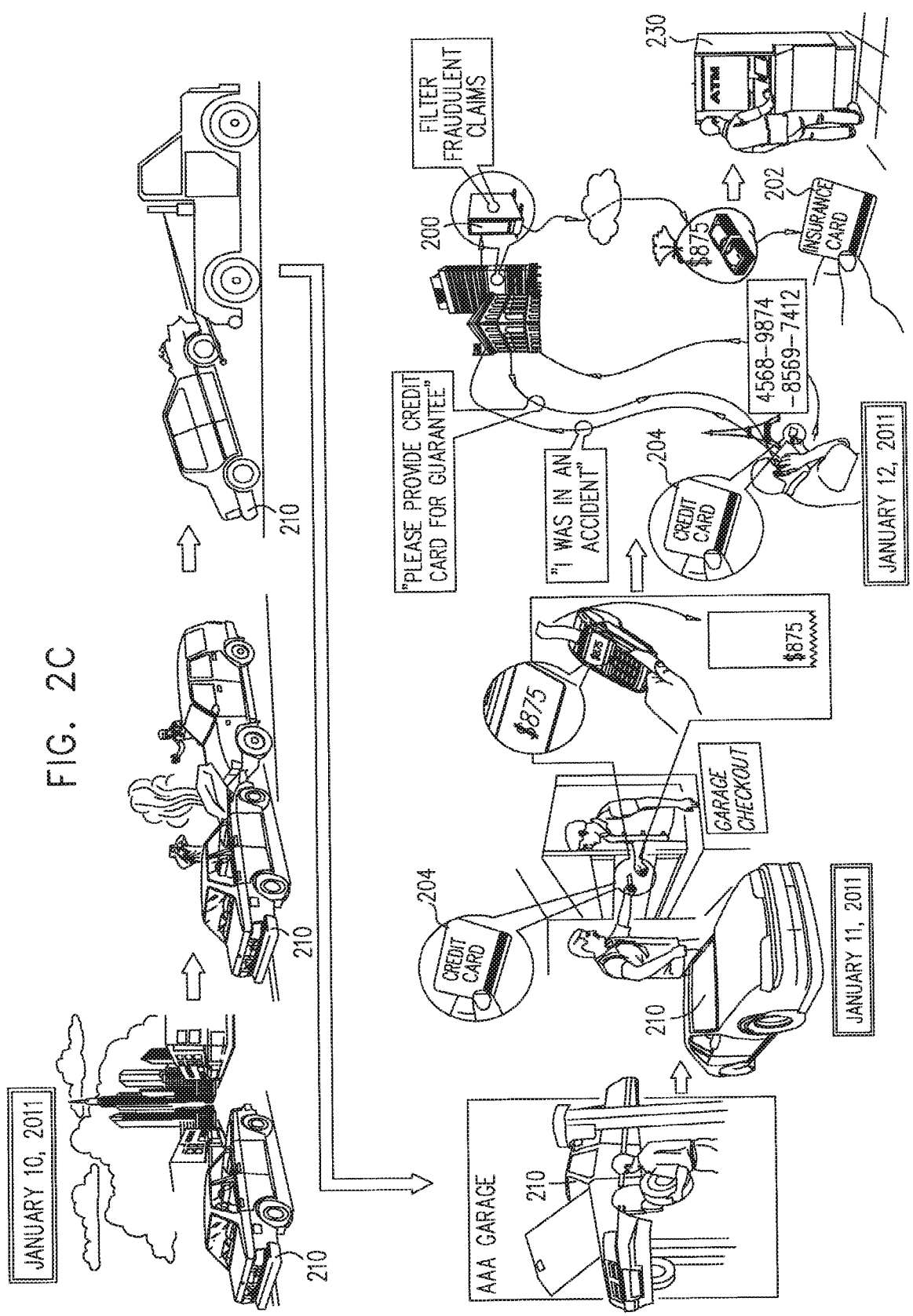

Alternatively, as shown in FIG. 2C, the insured defers contacting the insurer until after repairs to the automobile 210 are completed and after paying $875 to the garage 220. Payment may be achieved, for example, by charging the insured's credit card 204. After checking out of the garage 220, the insured contacts the insurer to report the accident and to request reimbursement for the cost of the repairs. In response, the insured is prompted to provide personal credit card details for guarantee. Upon determining with a high degree of certainty that the insured's claim is not fraudulent or unjustified, and upon obtaining a guarantee in the form of the insured's personal credit card 204 details, reimbursement is preferably provided to the insured via the insured's insurance card 202, personal credit card 204, personal debit card, or to the insured's bank account. As seen in FIG. 2C, subsequent to the reimbursement, the insured withdraws the reimbursed sum of $875 via an ATM machine 230.

Figure 2D:
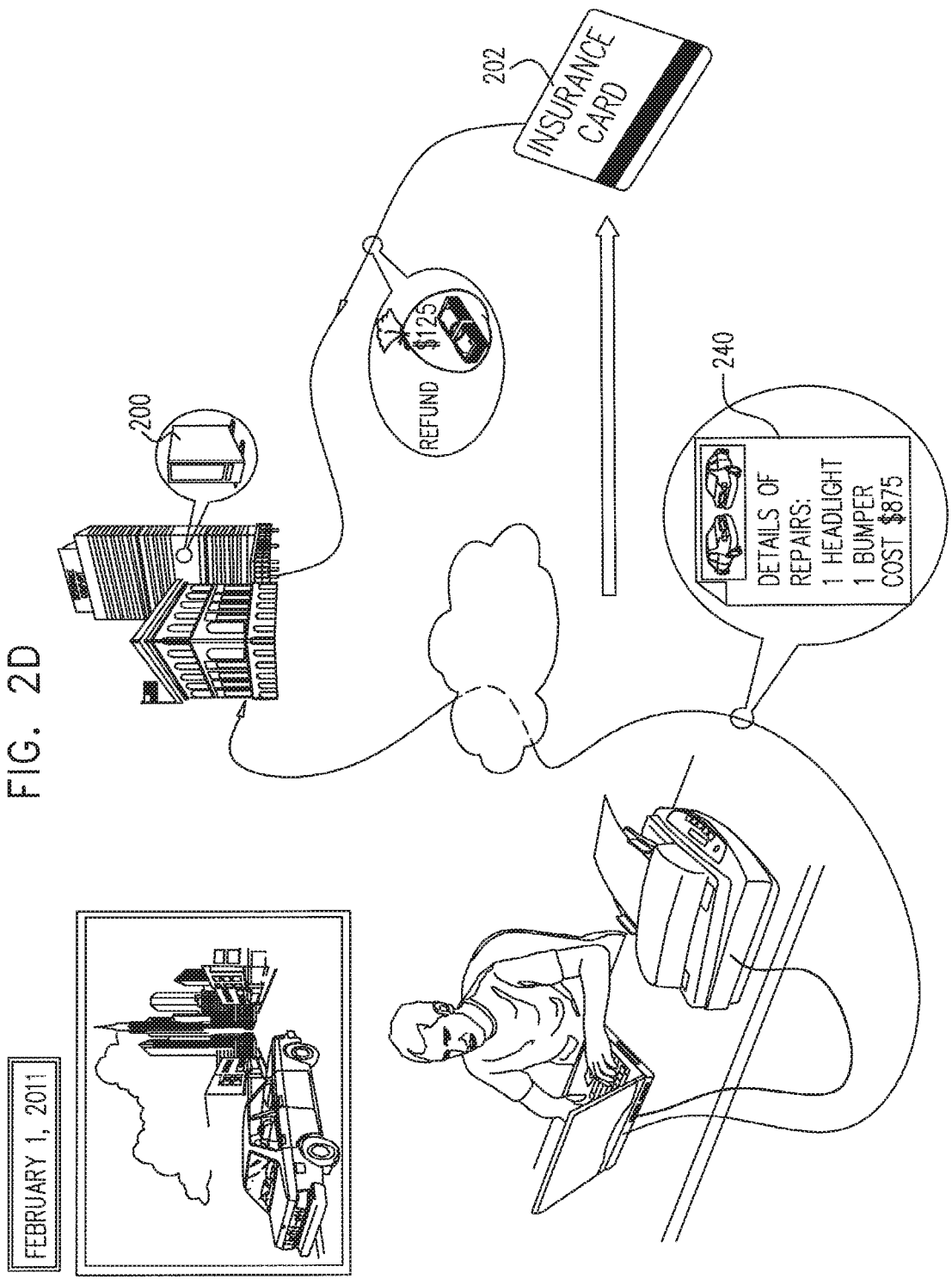

Turning now to FIG. 2D, it is shown that at a later date, such as on February 1, the insured provides documentation 240 to the insurer regarding automobile repairs provided and any related costs. Upon receiving documentation 240 of the repairs and its cost of $875 from the insured, self-executing insurance claim payment system 200 collects any difference between sums previously forwarded to the insured and the actual justified cost of the repairs as determined by the insurer, from the insured's insurance card 202. In the scenario of FIG. 2B, this difference is $125, which is the difference between the $1000 originally forwarded to the insured and the $875 which the insured actually paid for the repairs.

Alternatively, as shown in FIG. 2E, should the insured fail to provide such documentation within a reasonable amount of time, such as by March 1, self-executing insurance claim payment system 200 sends the insured a reminder to provide the documentation, warning him that failure to do so will result in the insurer invoking the guarantee provided in the form of credit card 204, as described hereinabove with regard to FIGS. 2B & 2C.

As shown in FIG. 2F, should the insured fail to provide relevant documentation by April 1, despite the warning sent by the insurer, self-executing insurance claim payment system 200 invokes the guarantee provided in the form of credit card 204, and charges the insured's credit card 204 for the total amount of $875 previously provided to the insured.

Figure 3A:
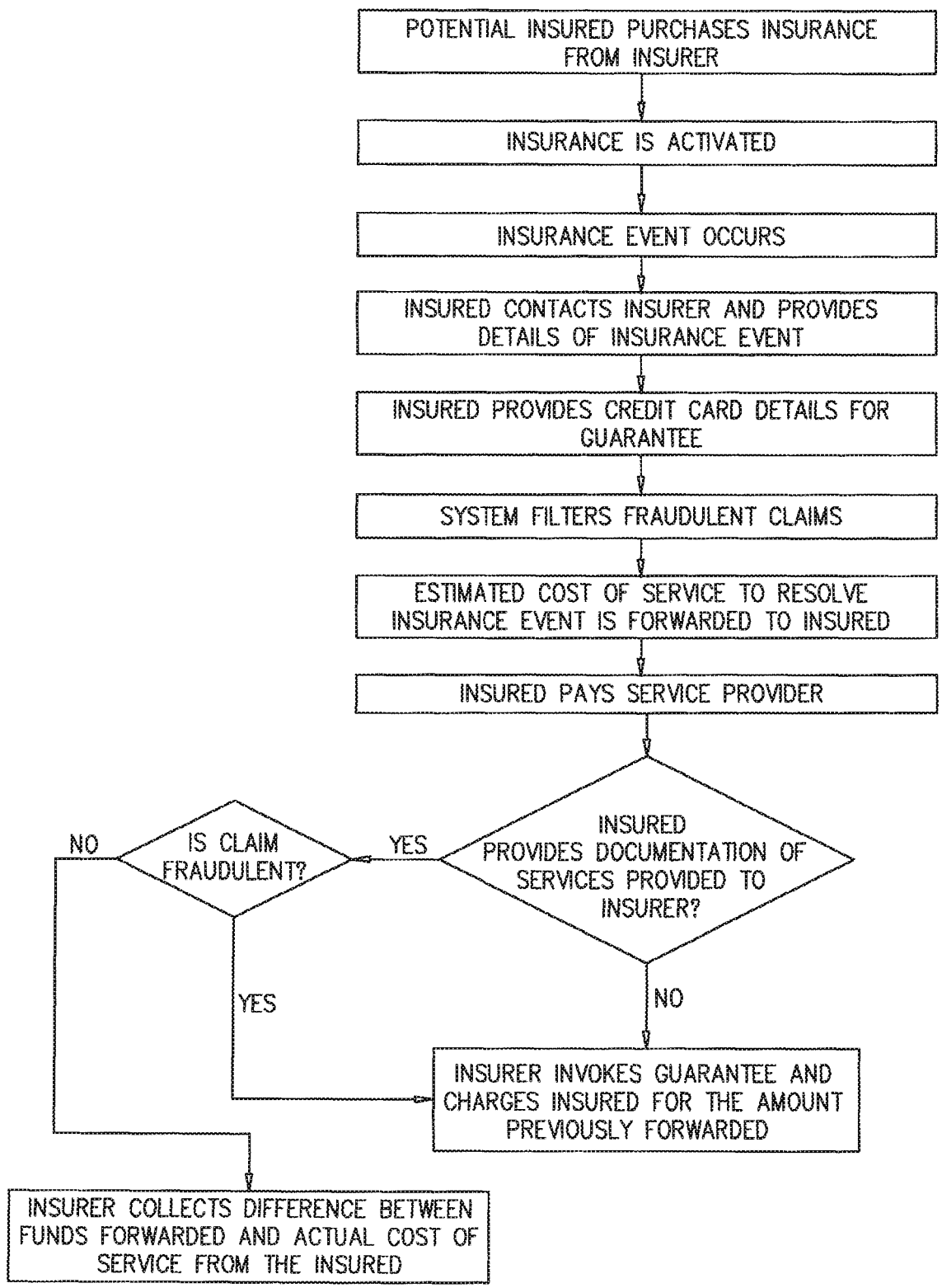
FIG. 3A is a simplified flow chart illustrating one example of the operation of the system of FIGS. 1A-2F.

Reference is now made to FIG. 3A, which is a simplified flow chart illustrating one example of the operation of the system of FIGS. 1A-2F. As shown in FIG. 3A, a potential purchaser of insurance purchases insurance from an insurer, which insurance is then activated by the insurer. After the occurrence of an insured event which is covered by the insurance, the insured contacts the insurer, provides details of the insured event and provides personal credit card details for guarantee. An insured event may be any event which resolution thereof incurs on the insured monetary expense which is covered under the terms of the purchased insurance.

The system, upon ascertaining with a high degree of certainty that the insured's claim is not fraudulent, forwards the estimated cost of resolving the insured event to the insured. The insured uses the forwarded funds to pay a service provider for services received to resolve the insured event. Upon providing, by the insured, documentation and details of the cost of services provided to the insured, the insurer utilizes the documentation to ascertain that the insured's claim is legitimate and not fraudulent. The insurer then collects the difference between the sum previously forwarded to the insured's insurance card and the actual cost of service as paid by the insured, from the insured insurance card. If the insured does not provide relevant documentation within a reasonable timeframe, or if the documentation is not sufficient to prove the legitimacy of the insured's claim, the insurer invokes the guarantee and charges the insured's credit card for the amount previously forwarded.

Figure 3B:
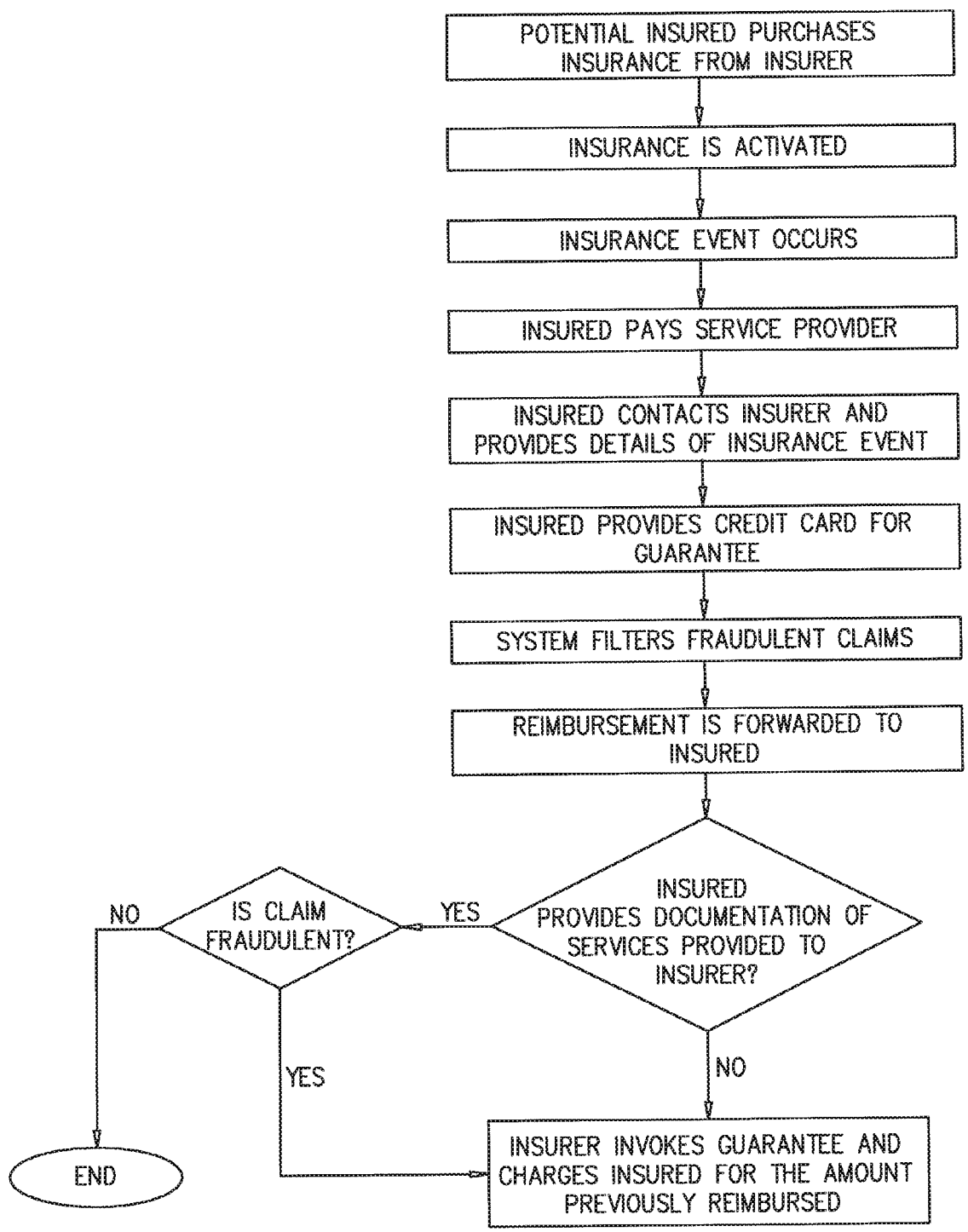
FIG. 3B is a simplified flow chart illustrating another example of the operation of the system of FIGS. 1A-2F.

Reference is now made to FIG. 3B, which is a simplified flow chart illustrating another example of the operation of the system of FIGS. 1A-2F. As shown in FIG. 3B, a potential purchaser of insurance purchases insurance from an insurer, which insurance is then activated by the insurer. After the occurrence of an insured event which is covered by the insurance, the insured pays a service provider for services received in conjunction with the insured event. The insured then contacts insurer and provides to the insurer details of the insured event and personal credit card details for guarantee. The system, upon ascertaining with a high degree of certainty that the insured's claim is not fraudulent, forwards to the insured reimbursement of sums paid by the insured to the service provider, and requests the insured to provide documentation of the services provided and costs thereof to the insurer. If the insured does not provide relevant documentation within a reasonable timeframe, or if the documentation is not sufficient to prove the legitimacy of the insured's claim, the insurer invokes the guarantee and charges the insured's credit card for the amount previously reimbursed.

It will be appreciated by persons skilled in the art that the present invention is not limited by what has been particularly shown and described hereinabove. Rather the scope of the present invention includes both combinations and sub-combinations of the various features described hereinabove as well as modifications thereof which would occur to persons skilled in the art upon reading the foregoing description and which are not in the prior art.

The invention claimed is:

1. A system for providing remote automated payment of insurance claims, said system comprising:
dedicated payment cards, each linked to a unique identifier and including:
a non-transient medium for storing the unique identifier;
one or more electronically readable mediums or transmitters for communicating the unique identifier to exterior electronic devices through a radiating element which wirelessly transmits said unique identifier to a location specific communication device, each given location specific communication device comprising: (a) a sensor adapted to sense and identify said dedicated payment card within a coverage area of the given location specific communication device, and (b) communication circuitry configured to electronically send over a data network to a server functionally associated with a digital knowledgebase the unique identifier of each identified payment card along with an indicator of a location where the card was identified;

said digital knowledgebase containing data including rulesets for automated machine verification of insurance claims, including checking for cost appropriateness of different insured payment types in different locales;

a server functionally associated with said digital knowledgebase and configured to communicate with insurance claim payment related electronic devices over a digital data network, wherein said server:
  i. comprising communication circuitry to receive digitized requests for automated remote payment of insured payments, each digitized request received according to a predefined data format and including an identity of an insured party correlated to an individual unique identifier of one of said dedicated payment cards, an indicator of a claim category for a given insurance claim, an amount of the requested automated remote payment for the given insurance claim, and a geographical location associated with the given insurance claim for the requested automated remote payment; and
  ii. being configured to automatically authorize or deny each of the requests for remote payment, including automatically verifying:
    a. the identified insured party is of a type entitled to receive the requested automated remote payment;
    b. the amount of the requested automated remote payment;
    c. the geographical location of the requested automated remote payment is a location where the identified insured party is entitled to receive the requested automated remote payment; and
    d. the amount of the requested automated remote payment for the given insurance claim is within a range of allowable payment amounts for an insurance claim: (i) of the same category as the given insurance claim, and (ii) originating within the location associated with the given claim;

an automated payment interface configured to advance funds to an account associated with the individual unique identifier upon authorization of the individual request by the server;

wherein said server further comprises an interface to receive data relating to electronic payments performed by one of said dedicated payment cards, from electronic payment receiving devices, including paid amounts and payment locations;

and said server is further configured to verify:
  a. the paid amounts match the verified requested amount of the requested automated remote payment; and
  b. the payment location matches the geographical location.

2. The system according to claim 1, wherein said dedicated payment cards include data storage configured to store medical records of an insured party.

3. The system according to claim 1, wherein said server further comprises voice analysis circuits configured to automatically detect fraudulent requests for automated remote payment based on voice analysis.

4. A method for providing remote automated payment of insurance claims, said method comprising:

supplying insured parties with dedicated payment cards, each linked to a unique identifier and including:
  a non-transient medium for storing the unique identifier; and
  one or more electronically readable mediums or transmitters for communicating the unique identifier to exterior electronic devices through a radiating element which wirelessly transmits said unique identifier to a location specific wireless communication device, each given location specific communication device comprising: (a) a sensor adapted to sense and identify said dedicated payment card within a coverage area of the given location specific communication device, and (b) communication circuitry configured to electronically send over a data network to a server functionally associated with a digital knowledgebase the unique identifier of each identified payment card along with an indicator of a location where the card was identified;

maintaining said digital knowledgebase containing data including rulesets for automated machine verification of insurance claims, including checking for cost appropriateness of different insured payment types in different locales;

using a server functionally associated with said digital knowledgebase to receive digitized requests for automated remote payment of insured payments, each digitized request including an identity of an insured party correlated to an individual unique identifier of one of said dedicated payment cards, an indicator of a claim category for a given insurance claim, an amount of the requested automated remote payment for the given insurance claim, and a geographical location associated with the given insurance claim for the requested automated remote payment; and an automatically authorizing or denying each of the requests for remote payment, including automatically verifying:
  a. the identified insured party is of a type entitled to receive the requested automated remote payment;
  b. the amount of the requested automated remote payment,
  c. the geographical location of the requested automated remote payment is a location where the identified insured party is entitled to receive the requested automated remote payment; and
  d. the amount of the requested automated remote payment for the given insurance claim is within a range of allowable payment amounts for an insurance claim: (a) of the same category as the given insurance claim, and (b) originating within the location associated with the given claim;

using an automated payment interface to advance funds to an account associated with the individual unique identifier upon authorization of the individual request by the server;

receiving data relating to electronic payments performed by said one of said dedicated payment cards, from electronic payment receiving devices, including paid amounts and payment locations; and automatically verifying, using the server:
  a. the paid amounts match the verified requested amount of the requested automated remote payment; and
  b. the payment location matches the geographical location.

5. The method according to claim 4, wherein said dedicated payment cards include data storage configured to store medical records of an insured party.

6. The method according to claim 4, further comprising automatically detecting fraudulent requests for automated remote payment based on voice analysis.

7. A system for providing remote automated payment of insured payments, said system comprising:
- dedicated payment cards, each card linked to a unique identifier and including:
- a non-transient medium for storing the unique identifier and one or more electronically readable mediums or transmitters for communicating the unique identifier to at least one exterior electronic device;
- location communicating devices, each positioned to sense said dedicated payment cards at a specific border crossing, and each location communicating device comprising a sensor adapted to sense a presence and identify each said dedicated payment card within a coverage area of the location communicating device, and at least one location communicating device including communication circuitry configured to electronically notify a remote server of each dedicated payment card sensed and identified within a coverage area of one of the location communicating devices at the specific border crossing;
- said remote server being functionally associated with a digital knowledgebase containing data including rulesets for automated machine verification of insured payment request appropriateness, and said remote server comprising:
- communication circuitry to receive notifications from said location specific communicating devices and digitized requests for automated remote payment of a given insurance claim of specific a category, each digitized request including:
  - i. an identity of an insured party, correlated to an individual unique identifier of one of said dedicated payment cards,
  - ii. an amount of the requested automated remote payment; and
  - iii. a geographical location of the requested automated remote payment;
  - iv. an indicator of the category of the given insurance claim underlying the requested payment;
  and
- said server being configured to automatically authorize or deny each of the requests for remote payment, including automatically verifying:
  - i. the identified insured party is of a type entitled to receive the requested automated remote payment;
  - ii. the amount of the requested automated remote payment
  - iii. the geographical location of the requested automated remote payment matches the records of notifications relating to the individual unique identifier received from said location communicating device; and
  - iv. the amount of the requested automated remote payment for the given insurance claim is within a range of allowable payment amounts for an insurance claim: (a) of the same category as the given insurance claim, and (b) originating within the location associated with the given claim;
  and
- an automated payment interface configured to advance funds to an account associated with the individual unique identifier upon authorization of the individual request.

8. The system according to claim 7, wherein said dedicated payment cards include data storage configured to store medical records of an insured party.

9. The system according to claim 7, wherein said server further comprises voice analysis circuits configured to automatically detect fraudulent requests for automated remote payment based on voice analysis.

10. The system according to claim 7, wherein said knowledgebase includes accumulated statistics of cost of treatment of a wide range of medical treatments provided in any of a wide range of locales and medical institutions around the world.

* * * * *